US011880169B2

(12) United States Patent
Junod et al.

(10) Patent No.: US 11,880,169 B2
(45) Date of Patent: Jan. 23, 2024

(54) THREADED TIMEPIECE MEMBER

(71) Applicant: ROLEX SA, Geneva (CH)

(72) Inventors: Benoit Junod, Peillonex (FR); Patrice Nagel, Geneva (CH); Jean-Baptiste Robin, Annemasse (FR)

(73) Assignee: ROLEX SA, Geneva (CH)

( * ) Notice: Subject to any disclaimer, the term of this patent is extended or adjusted under 35 U.S.C. 154(b) by 369 days.

(21) Appl. No.: 17/372,033

(22) Filed: Jul. 9, 2021

(65) Prior Publication Data

US 2022/0066393 A1    Mar. 3, 2022

(30) Foreign Application Priority Data

Jul. 10, 2020   (EP) .................................. 20185189

(51) Int. Cl.
  *F16B 33/00*    (2006.01)
  *G04B 37/22*    (2006.01)
  *G04B 39/00*    (2006.01)

(52) U.S. Cl.
  CPC ......... *G04B 37/223* (2013.01); *G04B 39/002* (2013.01); *G04B 39/006* (2013.01); *F16B 33/00* (2013.01)

(58) Field of Classification Search
  CPC .... G04B 3/04; G04B 37/0033; G04B 37/103; G04B 37/223; G04B 39/00; G04B 39/002; G04B 39/006; F16B 31/02; F16B 33/00; F16B 33/006; F16B 33/04; F16B 37/00; F16B 2033/04
  USPC .................. 411/411, 432, 436; 368/297, 310
  See application file for complete search history.

(56) References Cited

U.S. PATENT DOCUMENTS

| 378,959 | A | * | 3/1888 | Henry | ...................... | G04B 3/04 |
| | | | | | | 968/30 |
| 403,511 | A | * | 5/1889 | Bradley | ................... | G04B 3/04 |
| | | | | | | 968/30 |
| 1,661,232 | A | * | 3/1928 | Perret | .................. | G04B 37/103 |
| | | | | | | 368/216 |
| 1,910,908 | A | * | 5/1933 | Weingartner | ........ | G04B 37/103 |
| | | | | | | 968/340 |
| 2,482,317 | A | * | 9/1949 | Borer | ................... | G04B 37/103 |
| | | | | | | 968/340 |

(Continued)

FOREIGN PATENT DOCUMENTS

| CH | 486 059 A | 2/1970 |
| CH | 13 597/73 A4 | 7/1976 |

(Continued)

OTHER PUBLICATIONS

Office Action dated Jan. 13, 2021 in counterpart EP application No. 20185189.6. (5 pages).

*Primary Examiner* — Roberta S Delisle
(74) *Attorney, Agent, or Firm* — WHDA, LLP (57) ABSTRACT

The invention concerns a timepiece member including a first axis and a first threading intended to cooperate with 5 a second threading provided on a second timepiece member. The first threading is configured so that a zone of contact between the first threading and the second threading extends over less than 50% of the height of the threads of the second threading or is configured so that the zone of contact between the first 10 threading and the second threading extends over less than 0.3 times the pitch of the threading.

24 Claims, 3 Drawing Sheets

(56) References Cited

U.S. PATENT DOCUMENTS

| | | | | |
|---|---|---|---|---|
| 3,535,869 A * | 10/1970 | Strigini | ................ | G04B 37/103 |
| | | | | 968/340 |
| 4,313,187 A * | 1/1982 | Waki | .................... | G04B 37/103 |
| | | | | 368/308 |
| 5,257,247 A * | 10/1993 | Miche | .................... | G04B 37/08 |
| | | | | 368/290 |
| 5,405,227 A | 4/1995 | His et al. | | |
| 6,872,899 B2 * | 3/2005 | Oshio | .................. | G04B 37/106 |
| | | | | 200/341 |
| 6,987,708 B2 * | 1/2006 | Megner | .................. | H01Q 1/273 |
| | | | | 368/278 |

FOREIGN PATENT DOCUMENTS

| | | |
|---|---|---|
| EP | 0 520 224 A1 | 12/1992 |
| EP | 0 575 277 A1 | 12/1993 |
| EP | 1 916 576 A1 | 4/2008 |
| EP | 3 276 432 A1 | 1/2018 |
| WO | 2013/072389 A1 | 5/2013 |

\* cited by examiner

THREADED TIMEPIECE MEMBER

This application claims priority of European Patent Application No. EP20185189.6, filed on Jul. 10, 2020, the contents of which is hereby incorporated by reference herein in its entirety.

The invention concerns a threaded member for timepieces. The invention also concerns a timepiece case including this kind of threaded member. The invention further concerns a timepiece including this kind of threaded member and/or this kind of timepiece case.

Watch enclosures conform to numerous constraints, in particular in terms of sealing, robustness, appearance, and must be carried out so as to prevent any unintended disassembly irremediably reflected in after sales service to exchange seals, cleaning, lubrication, or even repair.

For parts in which the mechanical behavior is fragile, for example made of ceramic (zirconia, alumina, composite materials, etc.), glass, sapphire, etc. having to provide the seal and/or having to be able to be assembled and disassembled, for example backs or bracelet links, the traditional assembly methods are not considered suitable.

In fact, fragile materials, like ceramic, glass, sapphire, etc. have very good strength in compression but poor tensile strength. This is why threaded systems made of fragile materials are considered unsuitable for assemblies subjected to high tensile loads. For example, if the tightening torque is too high, tension and/or shear stresses are generated on the thread leading to the latter cracking or even breaking.

Their use is therefore essentially limited to fields exploiting the other characteristics of ceramics (chemical resistance, resistance to extreme temperatures, amagnetism, biocompatibility, etc.) with limited mechanical stresses.

Already known are timepieces the case of which includes one or more enclosure elements made from a natural or synthetic hard mineral material such as sapphire, ceramic, natural or reconstituted stone, etc. These materials are not ductile and have only limited capacity to absorb shocks by deforming. This implies a resistance to tension stresses lower than that of metal parts with the same geometry. As a general rule, this low resistance to tensile stresses is not compatible with the stresses to which the component is subjected (assembly, high pressure, etc.).

A metal back is traditionally assembly to a metal middle by screwing, as described inter alia in the documents CH1359773 and CH486059. The threads are standardized and the interior and exterior threads conform to the same standard with the largest possible zone of contact of the threads.

To guarantee secure mounting and to minimize the risks of seizure, a metal back assembled with a metal middle is generally lubricated and tightened to a torque between 1 and 6 N·m inclusive. A back of this kind may moreover be required to withstand high pressures, in particular when diving.

In order to guarantee that is it possible to use the same assembling/disassembling tools as for metal backs, the thread of a fragile material back must be able to resist the same tightening torque, that is to say 1 to 6 N·m. It should also withstand high pressures as a function of the degree of sealing envisaged (for example sealing to 50 m, 100 m, 1220 m, or 3900 m).

If a ceramic thread is produced in accordance with the same usual standards, the tension stresses generated by tightening and/or high pressures exceed the strength of the ceramic, leading to irreversible deformation, cracking or even rupture, in particular at the level of the threads.

Also known are self-locking threaded assembly systems like that described in the document WO2013/072389 the nominal diameter of which is less than 1.5 mm and the threaded element of which features a second thread the longitudinal section of which has an asymmetric profile pitch. The assembly corresponds in particular to the Swiss watchmaking standards (NIHS) and to the in-house standards of watchmakers. The continuous contact between the assembly elements allows the tension forces to be distributed over the total length of the thread of the threaded parts in contact and therefore fatigue of the nut-and-screw system to be reduced.

To guarantee that both (interior and exterior) parts of a threaded assembly match correctly and withstand a specified load, the threads must conform to certain standards. The threads are defined therein by their profile, which incorporates the diameters of the part (outside diameter, inside diameter, etc.), the angle of the profile, the pitch, and where appropriate the helix angle.

Various standards define the shape of a thread, in particular the angle of the thread profile, the pitch and the diameter of the thread, for example NIHS 60-30, ISO (for example EN 10226-1 or ISO 261), UN (for example ASME B1.1), Whitworth, British Standard (BSPT), American National, Pipe Threads, NPT, NPTF, DIN 405, MJ, UNJ, etc.

The complete designation gives the values corresponding to the shape of the thread and the tolerances.

For example, the section of a thread having NIHS, ISO and UN thread profiles is like an equilateral triangle, that is to say that the flanks of the threads are at 60 degrees (angle between flanks). In Whitworth threads the flanks of the threads form an angle of 55 degrees.

Ceramic components are generally assembled onto metal components by means other than screwing in the ceramic, or the screw fastening is made reliable by integrating metal threaded bushes into the ceramic part.

The document EP0520224 describes a watch case including a metal middle and a ceramic back. The ceramic back is fixed to the middle by screws, the screws being screwed through the back into threads formed in the middle.

The document EP1916576 describes a watch case including a metal middle and a ceramic back. The ceramic back 1 is retained on the middle by a threaded metal clamping ring.

The document EP3276432 describes an assembly appropriate for fixing a ceramic or sapphire back to a ceramic or metal middle, in particular a gold middle. It discloses that the person skilled in the art is of the opinion that the very low ductility of ceramic materials does not allow standard fixing methods, in particular direct screwing. To alleviate this problem the above document proposes a connection with a specific geometry of bayonet type compressing a ring. The choice of the material of the ring determines the maximum tightening torque. For example, an amorphous alloy ring allows a tightening torque of approximately 3.2 N·m, similar to that which is usual for a back screwed onto a middle, for a seal of the same size.

The company Apple offers watches with a case (for example made of aluminum) and a cover (carrying biometric sensors) made of ceramic, sapphire or reinforced glass (ion-x glass). The cover is "clipped" on and retained with a PTFE seal.

Moreover, an assembly system using threads (or screwing), also designated a "threaded system", is routinely used for fixing at least two parts to one another. This kind of threaded system is adapted to provide a permanent assembly throughout its service life. Its benefit stems in particular from its simplicity (the assembly elements form part of the parts to be assembled), its capacity for disassembly and the resulting applications.

Generally speaking, a threaded system consists of a first threaded element for example in the form of a screw and a second threaded element for example in the form of a nut and installing it consists in associating the screw and the nut by applying a tightening torque during the screwing operation. Tightening the nut onto the screw enables the parts to be assembled to be compressed. The screw is therefore prestressed. The axial force to which it is subjected is called a tension. During screwing, a tightening torque is applied to the screw that enables the helical movement thereof in the nut and, when the parts are in contact, forcibly lengthens the screw and therefore places it under tension. In this kind of screwing method the tension induced by tightening the nut onto the screw is therefore linked to the torque applied to the nut. The relation between the tension and the torque is linked to numerous parameters.

The elements of the threaded system are therefore subjected to different types of mechanical stresses, for example in tension, in compression, in shear, etc.

The object of the invention is to provide a threaded timepiece member enabling improvement of the known prior art members and alleviation of the drawbacks mentioned above. In particular, the invention proposes a reliable threaded timepiece member made of a fragile material.

The invention enables the easy replacement of a metal component by a ceramic component without necessitating modification of the design of the second component with which the ceramic component is intended to cooperate. It further enables retention of the same assembly/disassembly tools as those developed for assembling metal components.

A timepiece member in accordance with the invention is defined by the following example 1:

1. A timepiece member including a first axis and a first threading having a pitch and intended to cooperate with a second threading provided on a second timepiece member, the first threading being configured so that a zone of contact between the first threading and the second threading extends over less than 50% of the height of the threads of the second threading or configured so that the zone of contact between the first threading and the second threading extends over less than 0.3 times the pitch, the extent of the contact zone being measured radially relative to the first axis from the root of the threads of the first threading.

Various embodiments of the timepiece member are defined by the following examples 2-8:

2. The timepiece member of example 1, wherein the first threading has a first thread angle, wherein the second threading has a second thread angle and wherein the value of the first thread angle is 2 to 4 degrees greater than the value of the second thread angle.
3. The timepiece member of examples 1 or 2, wherein the height of the threads of the first threading is less than 0.3 pitch.
4. The timepiece member of any one of the preceding examples, wherein the first threading has a thread root radius greater than 0.2 times the pitch of the first threading or greater than 0.4 times the pitch of the first threading.
5. The timepiece member of any of the preceding examples, wherein the first threading is connected to a bearing surface by means of a connecting fillet having a radius greater than 0.4 times the pitch of the first threading or greater than 0.8 times the pitch of the first threading.
6. The timepiece member of any one of the preceding examples, wherein the second threading is a normalized thread, in particular a thread conforming to an ISO standard or an NIHS standard or a UN standard or a BSPT standard or an NPT standard or an NPTF standard or a DIN standard or an MJ standard or a UNJ standard or in accordance with a Whitworth profile.
7. The timepiece member of any one of the preceding examples, wherein the timepiece member is made of a fragile type material, in particular of ceramic or of sapphire or of zirconia or of glass, or wherein the timepiece member is made mainly of metal or metal alloy and the first threading has surfaces consisting of a fragile type material, in particular ceramic, coating.
8. The timepiece member of any of the preceding examples, wherein:

the timepiece member is a back and the second timepiece member is a middle or an interior middle; or the timepiece member is a middle or an interior middle and the second timepiece member is a back; or the timepiece member is a middle and the second timepiece member is an interior middle; or the timepiece member is an interior middle and the second timepiece member is a middle; or the timepiece member is a crown and the second timepiece member is a crown tube; or the timepiece member is a crown tube and the second timepiece member is a crown; or the timepiece member is a crown and the second timepiece member is a crown cap; or the timepiece member is a valve tube and the second timepiece member is a valve; or the timepiece member is a corrector tube and the second timepiece member is a corrector; or the timepiece member is a cap and the second timepiece member is a crown or a crown tube or a central cannon; or the timepiece member is a screw and the second timepiece member is a bracelet link.

A timepiece case in accordance with the invention is defined by the following example 9:

9. A case for a timepiece part, including a first timepiece member of any one of examples 1 to 8 and another timepiece member, in particular another timepiece member of any one of examples 1 to 8, and/or another timepiece member screwed onto or into the first member.

Embodiments of the timepiece case are defined by the following examples 10 and 11:

10. A case of a timepiece, including a middle, in particular a metal middle, and a back of any one of examples 1 to 8.
11. A case for a timepiece part including a back, in particular a metal back, and a middle of any one of examples 1 to 8. A timepiece in accordance with the invention is defined by the following example 12:
12. A timepiece, in particular a watch, in particular a wristwatch, including a timepiece member of any one of examples 1 to 8 and/or a case for a timepiece of any of examples 9 to 11.

The appended drawings represent by way of example one embodiment of a timepiece.

One embodiment of a timepiece 200 is described hereinafter with reference to FIG. 1.

The timepiece 200 is for example a watch, in particular a wristwatch.

The timepiece 200 includes a timepiece case 100. The timepiece case 100 is intended to receive a movement in order to protect the latter from the external environment. The case is preferably sealed.

The timepiece movement may be an electronic movement or a mechanical movement, in particular an automatic movement.

The timepiece case comprises a first member 10 or first component and a second member 20 or second component that are intended to be screwed together. In other words, each of the two members includes a thread and one of the two members is screwed into the other by cooperation of the two threads. The two threads therefore have the same pitch and more generally, dimensional characteristics enabling them to cooperate with one another.

The first timepiece member 10 includes a first axis A10 and includes a first threading 11 having a pitch p and intended to cooperate with a second threading 21 provided on the second timepiece member 20. The first threading is:
conformed or configured so that a zone C of contact between the first threading and the second threading extends over less than 50% of the height h of the threads of the second threading, or even less than 30% of the height h of the threads of the second threading, or even less than 15% of the height h of the threads of the second threading, or
conformed or configured so that the zone C of contact between the first threading and the second threading extends over less than 0.3 times the pitch p, or even less than 0.2 times the pitch p, or even over less than 0.1 times the pitch p,
the extent e of the contact zone C being measured radially relative to the first axis A10 from the roots 15 of the threads of the first threading.

These geometric characteristics preferably apply to all or to virtually all or to the majority of the thread portions that are in contact. In other words, these characteristics do not apply only at the level of a screwing interface portion between the first and second members.

Each threading comprises one or more threads and has a helical overall shape about the axis A10. Each thread is a helical portion the length of which measured along the axis is equal to the pitch. The root 15 of the threading is the junction between two flanks 16 of adjacent threads. The thread flanks 16, that is to say the sides of the threads, correspond to the parts situated between the crests 14 and the roots 15 of the threads. The crest 14 of a thread is the portion where the two flanks 16 of the same thread join.

The first threading 11 preferably has a first thread angle 12, the second threading 21 preferably has a second thread angle 22 and the value of the first thread angle 12 is 2 to 4 degrees greater than the value of the second thread angle 22. A thread angle is defined as the angle that the two flanks of a thread form at the level of an axial section of the threading.

By adapting the dimensions of the threading of the first member and/or of the second member it is possible to propose assembly of the fragile material first member with the second member the threading of which is standardized.

Whereas a prior art threading is designed to maximize the bearing surface of the two threadings for better distribution of the various forces at the level of the interfaces during assembly, with the consequence that the flanks of the threads of the two members are as parallel as possible, in this embodiment one of the threadings has an appropriate thread angle in order for the flanks of the first threading of the first member to bear on or to be in contact against the flanks of the second threading of the second member, as previously stated, at the level of contact zones extending as close as possible to the roots of the threads of the first threading. The contact zones preferably extend at most over a distance (measured radially relative to the axis A10) less than h/2 or less than h/4 or less than h/8 with h corresponding to the height of the threads of the first threading or to the height of the threads of the second threading.

The thread angle difference between the first and second threadings must not significantly impact the behavior of the assembly, for example strength, seal, seizure, etc.

The modification of the thread angle of the first threading so that the contact zone between the two threadings is moved in an appropriate manner (relative to an extended contact configuration when the two thread angles are identical) may be determined as a function of the nominal dimensions of the second threading.

For example, for a threading conforming to an ISO standard, a 2° to 4° increase in the thread angle of the first threading relative to the angle specified in the standard enables a reduction of tension stresses of the order of 20% as shown by the calculations of the inventors. The thread angle of the first threading is then between 62° and 64°. With such dimensions the contact between the thread flanks of the first member and the thread flanks of the second member is situated in the lower part of the flanks of the first threading, in the vicinity of the thread root of the first member.

Alternatively or additionally the threads of the first threading can be truncated to reduce the area of contact with a height of the threads of the first threading less than 0.3 pitch. This configuration makes it possible to prevent "point" bearing of the thread of the first threading generating increased stresses through a lever effect. In this embodiment, the thread angles of the first and second threadings may be:
equal, or
non-equal, as described above.

The threads of the first threading may be truncated so that the crests of the axial sections of the threads of the first thread have a rectilinear or convex shape.

The first threading preferably has a thread root radius r greater than 0.2 times the pitch of the first threading or greater than 0.4 times the pitch of the first threading.

Figure 2:
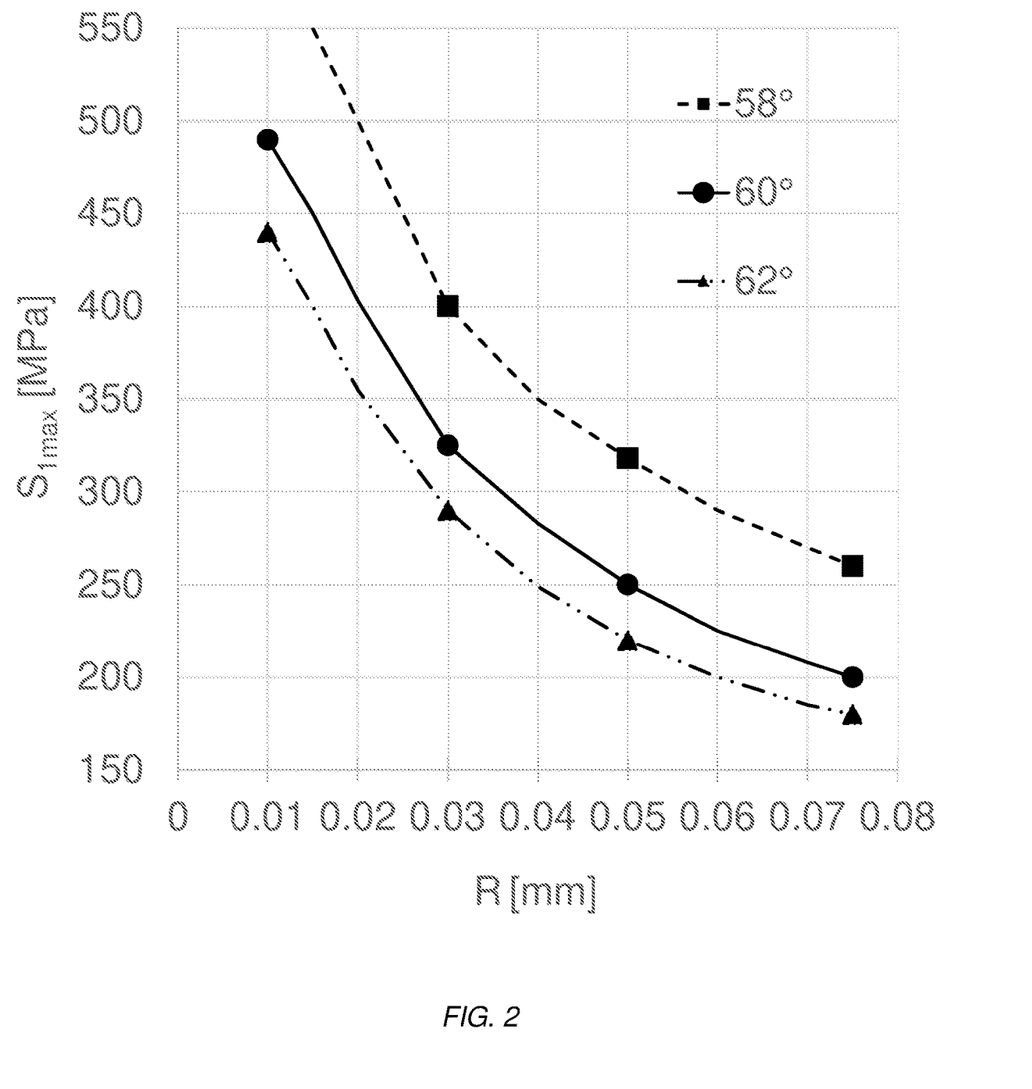
FIG. 2 shows the evolution of a maximum stress in a back ($S_{1max}$) as a function of the root radius (R) of the threading of the back for different angles of the threading of the back.
Figure 3:
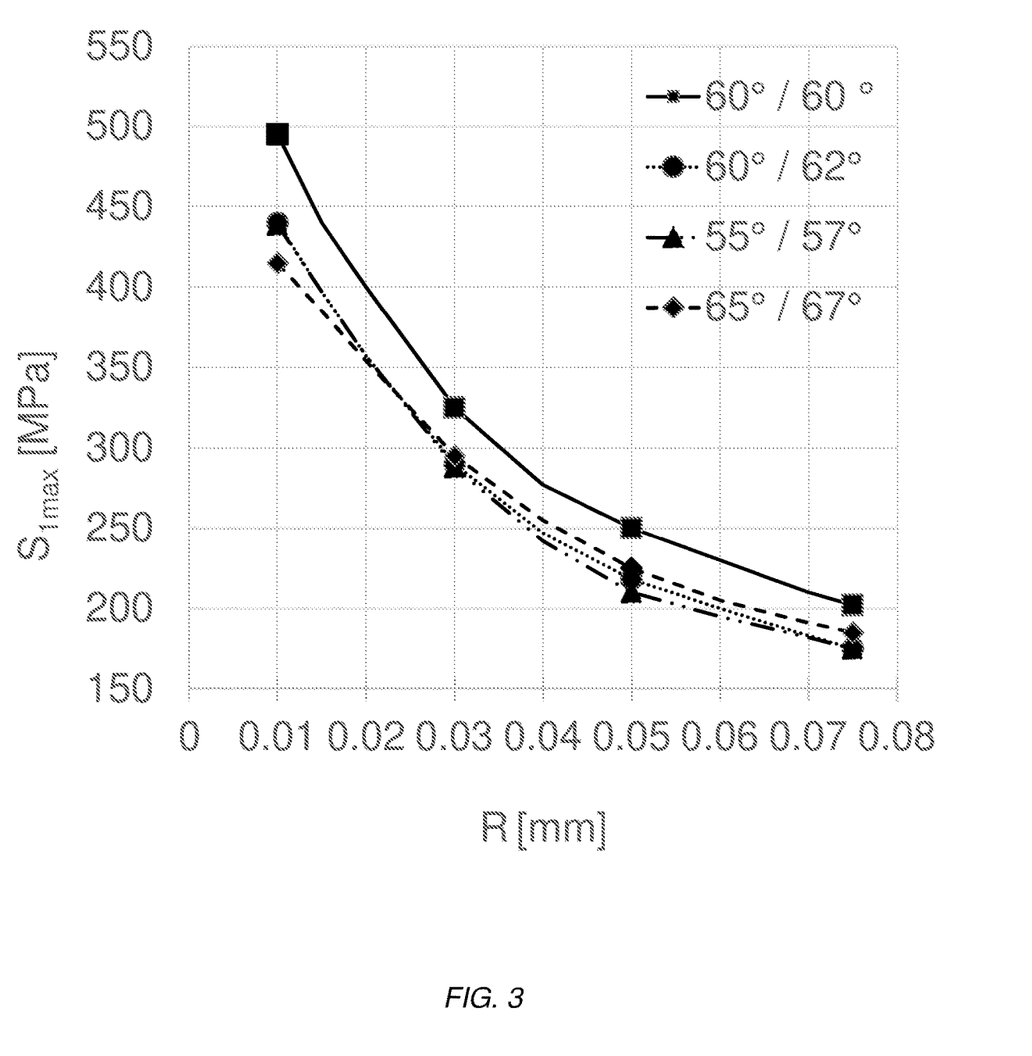
FIG. 3 shows the evolution of a maximum stress in a back ($S_{1max}$) as a function of the radius of the root radius (R) of the threading of the back for different assemblies having various characteristics in terms of back thread angles and middle thread.

Optimizing the radius r of the root 15 of the thread also enables contribution to the reduction of tensile stresses in the first member, as shown in the graphs in FIGS. 2 and 3.

For a zirconia back assembled with a stainless steel middle having a normalized thread (ISO standard), FIG. 2 shows the impact of the thread root radius on the stress to which the threading of the back is subjected for different thread angles of the back.

FIG. 3 shows the use of a thread with a thread angle different from 60°. The choice of the thread standard has little influence on the aimed for performance. It is mainly the use of a greater angle, 2° to 4° greater than the usual values, on the threading of the back that enables reduction of the stress, whereas evolution of the thread angle to 55° or 65° has little influence.

When the first member is a screw type member the first threading is preferably connected to a bearing surface 5 via a connecting fillet 13 having a radius greater than 0.4 times the pitch p of the first threading or greater than 0.8 times the pitch p of the first threading. This bearing surface extends radially outward from the first threading and is intended to come to bear against a second surface 25 provided on the second timepiece member. For example, a seal may be disposed between these two surfaces in order to provide a seal between the two members.

For example, the connecting fillet 13 forms part of a groove or a cavity that has two groove walls and a groove bottom and makes the connection between the bearing plane 5 and the first threading 11. On the thread side a first groove wall may have a straight and/or curved axial section. The curvature may be defined by a groove radius 18*a*. On the bearing surface 5 side the groove wall may have a straight and/or curved axial section. The curvature may be defined by a groove radius 18*b*.

The groove bottom may have a "point" axial section, that is to say its axial section may be the point of intersection of the axial sections of the two groove walls. Alternatively, the groove bottom may be more extensive, as represented in FIG. 1 in which two curved portions 18*a* and 18*b* are connected by a straight section portion.

The first member is also subjected to tensile stresses in the vicinity of this groove.

For watch case type components, typically for back-middle assemblies, the metal first members have thread side groove radii 18*a* and bearing plane side radii 18*b* between 0.06 mm and 0.15 mm inclusive. Their nominal value is 0.05 mm.

The thread side groove radii 18*a* and bearing plane side radii 18*b* may be identical or different.

If the thread side groove radius 18*a* increases from 0.1 mm to 0.2 mm the value of the mechanical stresses is reduced by of the order of 20%. If the thread side groove radius 18*a* increases from 0.1 mm to 0.4 mm the value of the mechanical stresses is reduced by of the order of 40%.

The connecting angle between the groove and the bearing plane may be a right angle, an acute angle or an obtuse angle, with or without pitting of the material.

The connection between the groove and the bearing plane may be plane or recessed without impacting the tensile strength of the groove.

The second threading 21 is preferably standardized. In particular, the second threading may be a threading conforming to an ISO standard or an NI HS standard or a UN standard or a BSPT standard or an NPT standard or an NPTF standard or a DIN standard or an MJ standard or a UNJ standard or in accordance with a Whitworth profile.

Figure 1:
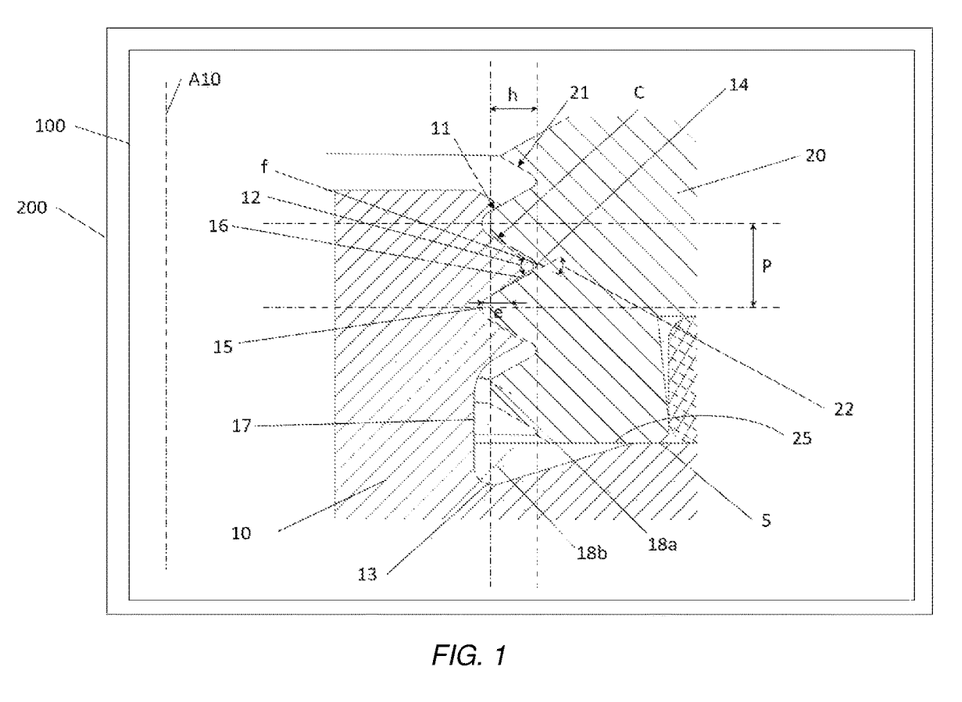
FIG. 1 represents a first embodiment of a timepiece.

In the example described and represented in FIG. 1 the first threading is an external or exterior threading, that is to say produced on a projecting surface, for example on a surface of a shaft.

In the example described and represented in FIG. 1, the second threading is an internal or interior threading, that is to say produced on a recessed surface, for example on a surface of a bore.

In the example described and represented in FIG. 1, the first member is a fragile material back, in particular one made of ceramic or of sapphire or of zirconia of or glass, the first threading of which is subjected to tensile loads. The back is assembled to a second member that consists of a middle. That middle is made of a more ductile material, in particular from a metal or a metal alloy.

The following configurations may be envisaged, for example:
- the first timepiece member 10 is a back and the second timepiece member 20 is a middle or an interior middle, or
- the first timepiece member 10 is a middle or an interior middle and the second timepiece member 20 is a back, or
- the first timepiece member 10 is a middle and the second timepiece member 20 is an interior middle, or
- the first timepiece member 10 is an interior middle and the second timepiece member 20 is a middle, or
- the first timepiece member 10 is a crown and the second timepiece member 20 is a crown tube, or
- the first timepiece member 10 is a crown tube and the second timepiece member 20 is a crown, or
- the first timepiece member 10 is a crown and the second timepiece member 20 is a crown cap, or
- the timepiece member 10 is a valve tube and the second timepiece member 20 is a valve, or
- the timepiece member 10 is a corrector tube and the second timepiece member 20 is a corrector, or
- the first timepiece member 10 is a cap and the second timepiece member 20 is a crown or a crown tube or a central hour wheel, or
- the first timepiece member 10 is a screw and the second timepiece member 20 is a link of a bracelet.

The invention may be transposed to any other type of screw fastening in which a fragile material first member, in particular made of ceramic or of sapphire or of zirconia or of glass, cooperates with a second member made of a more ductile material, in particular a metal or a metal alloy, to produce an assembly. The invention may also be transposed to any other type of screw fastening where a fragile material first member, in particular made of ceramic or of sapphire or of zirconia or of glass, cooperates with a fragile material second member, in particular one made of ceramic or of sapphire or of zirconia or of glass, to produce an assembly. For example, the first and second members are screwed one into the other so that they are mechanically stressed, the member constituting the screw being for example mechanically stressed in tension.

During the placement or mounting of a threaded assembly, that is to say during the screwing of the first and second members one into the other by rotation of one member about the axis A10, it is of primary importance to apply a tightening torque producing appropriate mechanical stresses, in particular an appropriate tension that must make it possible to take account of the elements of the first and second members coming into mutual contact and to compensate any additional forces caused by shocks, vibrations, pressure, sources of expansion or contraction, thermal or hygrometric variations, etc.

The applied tightening torque must in particular be mastered in the case of a sealed or safety assembly. If it is too low, the system risks leaking or loosening; if it is too high there is a risk of the members, in particular one of the threads, being damaged or even broken.

Curves for the usual materials make it possible to determine the limit value to be adopted before the nut-and-screw pair is damaged for predetermined dimensions in a given material and in a given normative frame of reference. No such curves exist for pairs of materials involving metal alloys and fragile materials such as a ceramic, sapphire, zirconia or glass.

When the members of a threaded assembly are tightened, only some of the screwing/tightening energy really contributes to the tightening (deformation of one or both members along the helical connecting axis), the rest of the energy being dissipated, in particular by friction on the threads. The friction is necessary to prevent loosening over time. These mechanisms are however liable to cause seizure of the assembly if the friction is too high.

The seizing threshold of a pair of materials is defined by the value of the contact pressure at which a transfer of material occurs from one surface to the other. There exists a seizing threshold for each pair of materials. Apart from the surface state, that threshold depends on the chemical and/or metallurgical nature of each of the two materials in contact.

In the case of screwed assemblies, seizure may occur in two steps, micro-seizure followed where applicable by total seizure.

Micro-seizure occurs when the tension does not increase in a linear manner but in steps when the tightening torque increases. This is the case for example of microwelds produced and then broken by the tightening torque applied as and when they occur (this is the "stick-slip" phenomenon). Relative rotation remains possible between the elements but the tightening is disturbed. This phenomenon may be localized.

Micro-seizure is generally accentuated as the tightening torque increases, up to total seizure. When there is total seizure all rotation is prevented.

A prestressed threaded assembly can be disassembled provided that no seizure has occurred between the members after tightening. This implies that to guarantee that a threaded assembly can be disassembled certain precautions are necessary, inter alia in order to prevent any micro-seizure during initial tightening, preventing all corrosion in service and maintaining a correct coefficient of friction during the life of the assembly.

It is therefore necessary to find solutions for limiting friction in order to render the torque/tension relation in the assembly as constant as possible. By measurement or from curves it is known how to determine from what tightening torque there is a risk of seizure occurring: in fact, knowing that the coefficient of this friction must be constant, from a certain torque value a significant increase in that coefficient reveals a seizure phenomenon. To raise the seizing threshold it is therefore necessary to act on the friction at the level of the contact surfaces of the assembly.

Stainless steel, aluminum and titanium threadings are particularly subject to seizing.

In order to minimize, or even to avoid, these phenomena stainless steel assemblies are generally treated, for example with a lubricant or an "anti-seizing" coating. These treatments are liable to degrade over time.

For a stainless steel back assembled to a stainless steel case with no lubrication seizure problems are already observed with tightening torques less than 3 N·m.

It has been observed that a ceramic member, for example a zirconia member, in accordance with the invention has a lower probability of seizure than a metal member that it replaces. For a zirconia member, with a tightening torque of 5 N·m, no seizure or deformation has been observed, even without treatment of the metal part.

The solutions described above therefore make it possible to prevent seizure of the elements of the threaded system, in particular during tightening, to guarantee that the assembly can be disassembled.

The system also withstands higher tightening torques without seizure. For example, a torque of 10 N·m has been applied to a zirconia back in accordance with the invention assembled to a stainless steel middle without initiating seizure or deformation of the members, even without treatment of the metal part.

Alternatively, in place of the fragile material threading, the threading may be a ceramic-coated metal threading, that is to say a threading in which the thread surfaces consist of a ceramic coating. Ceramic coating can be obtained by thermal spraying of a ceramic, by surface treatment, by heat treatment or by any other appropriate technique. In this case the invention makes it possible to minimize the risks of cracking or of chipping of the ceramic layer as well as those of seizure of the assembly. The base material is for example stainless steel, titanium, etc. The ceramic layer is for example a layer of oxidized ceramic (zirconia, alumina, aluminum titanate, etc.) or non-oxidized ceramic such as a nitride or a carbide (aluminum nitride, silicon nitride, silicon carbide, tungsten carbide, etc.).

Thanks to the invention it is possible to produce fragile material or metal alloy backs having the same or substantially the same geometries and able to be interchanged to cooperate with the same middle, in particular the same metal middle. Moreover, these backs can be mounted without it being necessary to modify the production or after sales service tools for fitting/removing the back, irrespective of the material from which the back is made.

Thanks to the invention it is possible to produce a sealed wristwatch case including a fragile material, in particular ceramic, sapphire, zirconia or glass, replacing a metal back without adaptation of the metal middle.

Thanks to the invention, it is possible to modify the threading of the fragile material back in order to preserve its integrity during screwing, under tightening and use conditions identical to those of a metal back. Moreover, the seizure problems encountered with metal backs are avoided, even with tightening torques higher than those usually employed with metal alloy backs.

Thanks to the invention it is therefore possible specifically to determine the dimensions of a threading of a fragile type material member in order for the threading to resist the same ranges of stresses as a metal part that the member replaces and in order for the threading to be compatible with the standard threading, for example threading conforming to the Swiss watchmaking standards (NIHS). The dimensions take account of the order of magnitude of the stress fields and the probabilities of rupture of the fragile type material member.

With the intention of being able to offer ceramic backs there in fact exists a benefit for a solution for determining the dimensions of a screw thread on a fragile type material, in particular a ceramic material, that is compatible with the standardized threads and enables the assembly of fragile type material parts by screwing. A ceramic back mounted on a metal middle with a thread having increased strength—in particular in relation to stresses induced during assembly and/or by the environment, for example by the compression of the assembly when diving—offers one example of such benefit.

This design advantageously enables the easy replacement of a metallic back by a ceramic back without it being necessary to modify the design of the metal part that receives it and/or the tools for fitting/removing the back, while guaranteeing a conforming seal, secure assembly and minimized risks of seizure.

On the contrary, in accordance with the prior art, the exterior and interior threads are machined in accordance with the same class with the same tolerance in order to be compatible and to maximize the area of contact between the exterior and interior threads. If the exterior and interior threads are machined in accordance with the same class, taking account of the tolerances, the flanks of the interior thread and the flanks of the exterior thread are contact over the largest possible area, the flanks being the "flattest" possible. These dimensions in accordance with the prior art were aimed at mastering assembly, in particular the tearing off of the threads, and the phenomena of seizure, and to optimize the strength of the assembly.

In accordance with another aspect of the invention, an assembly, in particular a timepiece case, comprises:
- a first member 10 made from a fragile type material, in particular ceramic or sapphire or zirconia or glass, or having thread surfaces consisting of a fragile type material coating, in particular ceramic or sapphire or zirconia or glass coating, and
- a second member 20 made, in particular mainly made, of a metal or metal alloy.

The first and second members are advantageously connected by a threaded connection or screwed to one another.

In accordance with this other aspect of the invention, a timepiece includes such an assembly.

Failing any logical or technical incompatibility, this other aspect of the invention may include any combination of the features described in the present document.

The invention claimed is:

1. A timepiece member including a first axis and a first threading having a pitch and intended to cooperate with a second threading provided on a second timepiece member, the first threading having a zone of contact between the first threading and the second threading extending over less than 50% of the height of the threads of the second threading or the zone of contact between the first threading and the second threading extending over less than 0.3 times the pitch, the extent of the contact zone being measured radially relative to the first axis from the root of the threads of the first threading.

2. The timepiece member as claimed in claim 1, wherein the first threading has a first thread angle, wherein the second threading has a second thread angle and wherein the value of the first thread angle is 2 to 4 degrees greater than the value of the second thread angle.

3. The timepiece member as claimed in claim 2, wherein the height of the threads of the first threading is less than 0.3 pitch.

4. The timepiece member as claimed in claim 2, wherein the first threading has a thread root radius greater than 0.2 times the pitch of the first threading.

5. The timepiece member as claimed in claim 2, wherein the first threading is connected to a bearing surface by means of a connecting fillet having a radius greater than 0.4 times the pitch of the first threading.

6. The timepiece member as claimed in claim 1, wherein the height of the threads of the first threading is less than 0.3 pitch.

7. The timepiece member as claimed in claim 6, wherein the first threading has a thread root radius greater than 0.2 times the pitch of the first threading.

8. The timepiece member as claimed in claim 6, wherein the first threading is connected to a bearing surface by means of a connecting fillet having a radius greater than 0.4 times the pitch of the first threading.

9. The timepiece member as claimed in claim 1, wherein the first threading has a thread root radius greater than 0.2 times the pitch of the first threading.

10. The timepiece member as claimed in claim 9, wherein the first threading is connected to a bearing surface by means of a connecting fillet having a radius greater than 0.4 times the pitch of the first threading.

11. The timepiece member as claimed in claim 1, wherein the first threading is connected to a bearing surface by means of a connecting fillet having a radius greater than 0.4 times the pitch of the first threading.

12. The timepiece member as claimed in claim 1, wherein the second threading is a normalized thread, in particular a thread conforming to an ISO standard or an NIHS standard or a UN standard or a BSPT standard or an NPT standard or an NPTF standard or a DIN standard or an MJ standard or a UNJ standard or in accordance with a Whitworth profile.

13. The timepiece member as claimed in claim 1, wherein the timepiece member is made of a fragile type material, in particular of ceramic or of sapphire or of zirconia or of glass, or wherein the timepiece member is made mainly of metal or metal alloy and the first threading has surfaces consisting of a fragile type material coating.

14. The timepiece member as claimed in claim 13, wherein the fragile type material is ceramic.

15. The timepiece member as claimed in claim 1, wherein:
- the timepiece member is a back and the second timepiece member is a middle or an interior middle; or
- the timepiece member is a middle or an interior middle and the second timepiece member is a back; or
- the timepiece member is a middle and the second timepiece member is an interior middle; or
- the timepiece member is an interior middle and the second timepiece member is a middle; or
- the timepiece member is a crown and the second timepiece member is a crown tube; or
- the timepiece member is a crown tube and the second timepiece member is a crown; or
- the timepiece member is a crown and the second timepiece member is a crown cap; or
- the timepiece member is a valve tube and the second timepiece member is a valve; or
- the timepiece member is a corrector tube and the second timepiece member is a corrector; or
- the timepiece member is a cap and the second timepiece member is a crown or a crown tube or a central cannon; or
- the timepiece member is a screw and the second timepiece member is a bracelet link.

16. A case for a timepiece, including the timepiece member as claimed in claim 1 the second timepiece member screwed onto or into the timepiece member.

17. The case of a timepiece as claimed in claim 16, wherein the timepiece member is a back and the second timepiece member is a middle.

18. The case of a timepiece as claimed in claim 17, wherein the middle is a metal middle.

19. The case for a timepiece part as claimed in claim 16, wherein the timepiece member is a middle and the second timepiece member is a back.

20. The case of a timepiece as claimed in claim 19, wherein the back is a metal back.

21. A timepiece including the case for a timepiece part as claimed in claim 16.

22. A timepiece including the timepiece member as claimed in claim 1.

23. The timepiece member as claimed in claim 1, wherein the first threading has a thread root radius greater than 0.4 times the pitch of the first threading.

24. The timepiece member as claimed in claim 1, wherein the first threading is connected to a bearing surface by means of a connecting fillet having a radius greater than 0.8 times the pitch of the first threading.

\* \* \* \* \*